US012412990B2

(12) United States Patent
Lee et al.

(10) Patent No.: US 12,412,990 B2
(45) Date of Patent: Sep. 9, 2025

(54) MICROSTRIP ARRAY ANTENNA

(71) Applicant: Electronics and Telecommunications Research Institute, Daejeon (KR)

(72) Inventors: Jaeho Lee, Daejeon (KR); Jang Yeol Kim, Daejeon (KR); Jung Hoon Oh, Daejeon (KR); Hyunjoon Lee, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 18/083,169

(22) Filed: Dec. 16, 2022

(65) Prior Publication Data

US 2023/0275354 A1 Aug. 31, 2023

(30) Foreign Application Priority Data

Feb. 25, 2022 (KR) ........................ 10-2022-0025296

(51) Int. Cl.
*H01Q 1/48* (2006.01)
*H01Q 13/20* (2006.01)

(52) U.S. Cl.
CPC ............. *H01Q 13/206* (2013.01); *H01Q 1/48* (2013.01)

(58) Field of Classification Search
CPC ........ H01Q 1/48; H01Q 1/246; H01Q 1/3233; H01Q 9/0457; H01Q 13/206; H01Q 21/08; H01Q 21/062; H01Q 21/065
See application file for complete search history.

(56) References Cited

U.S. PATENT DOCUMENTS

| | | | | |
|---|---|---|---|---|
| 4,203,116 | A * | 5/1980 | Lewin | H01Q 13/206 343/846 |
| 5,017,931 | A * | 5/1991 | Carlyon | H01Q 21/08 343/824 |
| 5,661,494 | A * | 8/1997 | Bondyopadhyay | H01Q 1/364 343/700 MS |
| 6,031,491 | A * | 2/2000 | Daniel | H01Q 21/065 343/824 |
| 6,281,843 | B1 * | 8/2001 | Evtioushkine | H01Q 1/38 343/815 |
| 10,403,969 | B2 | 9/2019 | Yoon et al. | |

(Continued)

FOREIGN PATENT DOCUMENTS

| | | |
|---|---|---|
| KR | 10-2005-0075619 | 7/2005 |
| KR | 10-0872177 | 12/2008 |

(Continued)

OTHER PUBLICATIONS

Wu et al., "A 76.5 GHz Microstrip Comb-Line Antenna Array for Automotive Radar System", 2015, 3 total pages.

*Primary Examiner* — Tung X Le
(74) *Attorney, Agent, or Firm* — KILE PARK REED & HOUTTEMAN PLLC

(57) ABSTRACT

Provided is a microstrip array antenna including a dielectric substrate, a feed line formed on a top surface of the dielectric substrate, a plurality of radiation elements formed on the top surface of the dielectric substrate and electrically connected to the feed line, and a ground surface formed on a bottom surface of the dielectric substrate. At least one radiation element among the plurality of radiation elements may have a bottleneck shape.

9 Claims, 11 Drawing Sheets

600

(56) References Cited

U.S. PATENT DOCUMENTS

| | | | | |
|---|---|---|---|---|
| 11,133,601 | B2 | 9/2021 | Yoon et al. | |
| 2007/0279303 | A1* | 12/2007 | Schoebel | H01Q 21/22 343/700 MS |
| 2017/0331197 | A1* | 11/2017 | Chung | H01Q 21/065 |
| 2021/0159609 | A1* | 5/2021 | Lee | H01Q 13/206 |
| 2023/0031609 | A1* | 2/2023 | Russo | H01P 5/1007 |
| 2023/0369780 | A1* | 11/2023 | Itami | H01Q 1/2283 |

FOREIGN PATENT DOCUMENTS

| | | |
|---|---|---|
| KR | 10-2017-0106249 | 9/2017 |
| KR | 10-2007876 | 8/2019 |
| KR | 10-2020-0110069 | 9/2020 |

* cited by examiner

600

| Element Number (i=1-17) | Conductance ratio | WIDTH [mm] ($W_{PI}$ for i=3~15, and $W_{CI}$ for i=1, 2, 16, 17) | LENGTH [mm] ($L_{PI}$ for i=3~15, and $L_{CI}$ for i=1, 2, 16, 17) |
|---|---|---|---|
| 1, 17 | 1.0 | 0.10 | 1.29 |
| 2, 16 | 1.12 | 0.18 | 1.23 |
| 3, 15 | 1.35 | 0.24 | 1.15 |
| 4, 14 | 1.71 | 0.41 | 1.11 |
| 5, 13 | 2.16 | 0.61 | 1.08 |
| 6, 12 | 2.65 | 0.72 | 1.08 |
| 7, 11 | 3.12 | 0.78 | 1.08 |
| 8, 10 | 3.45 | 0.80 | 1.08 |
| 9 | 3.57 | 0.81 | 1.09 |

FIG. 8A

| Element Number (i=1-17) | Conductance ratio | WIDTH [mm] ($W_{CI}$) | LENGTH [mm] ($L_{CI}$) |
|---|---|---|---|
| 1, 17 | 1.0 | 0.10 | 1.29 |
| 2, 16 | 1.12 | 0.18 | 1.23 |
| 3, 15 | 1.35 | 0.32 | 1.17 |
| 4, 14 | 1.71 | 0.48 | 1.13 |
| 5, 13 | 2.16 | 0.61 | 1.1 |
| 6, 12 | 2.65 | 0.68 | 1.09 |
| 7, 11 | 3.12 | 0.73 | 1.08 |
| 8, 10 | 3.45 | 0.75 | 1.07 |
| 9 | 3.57 | 0.76 | 1.05 |

FIG. 8B

MICROSTRIP ARRAY ANTENNA

CROSS-REFERENCE TO RELATED APPLICATION

This application claims the benefit of Korean Patent Application No. 10-2022-0025296 filed on Feb. 25, 2022, in the Korean Intellectual Property Office, the entire disclosure of which is incorporated herein by reference for all purposes.

BACKGROUND

1. Field of the Invention

One or more example embodiments relate to a microstrip array antenna.

2. Description of the Related Art

Microstrip antennas or microstrip patch antennas are thin, easy to attach to flat or uneven surfaces, are simple in design, may be manufactured at low cost using printed circuit technology, may be designed together with a monolithic microwave integrated circuit, and have excellent mechanical strength, so they are applied to various fields.

A microstrip comb-line array antenna is a type of series-fed microstrip patch array antenna, and has a structure in which a microstrip stub, which is a radiation element, is arranged on one side or both sides of a feed line. The microstrip comb-line array antenna has relatively low loss compared to microstrip patch array antennas of other forms and has a structure capable of high gain antenna development.

The above description is information the inventor(s) acquired during the course of conceiving the present disclosure, or already possessed at the time, and is not necessarily art publicly known before the present application was filed.

SUMMARY

Example embodiments use a bottleneck-shaped radiation element instead of a conventional wide rectangular radiation element to realize a big radiation conductance, thereby canceling a transverse direction current component to eliminate cross-polarized conductance, to easily design the antenna and improve design accuracy.

However, the technical aspects are not limited to the aforementioned aspects, and other technical aspects may be present.

According to an aspect, there is provided a microstrip array antenna including a dielectric substrate, a feed line formed on a top surface of the dielectric substrate, a plurality of radiation elements formed on the top surface of the dielectric substrate and electrically connected to the feed line, and a ground surface formed on a bottom surface of the dielectric substrate. At least one radiation element among the plurality of radiation elements may have a bottleneck shape.

The plurality of radiation elements may be arranged by a regular distance on one side of the feed line or arranged in a zig-zag form on both sides of the feed line.

The feed line may be directly connected to a chip or a transmission line to receive power from the chip or the transmission line.

The feed line may include various forms of transitions.

The microstrip array antenna according to various example embodiments may further include a matching circuit for impedance matching with the chip or the transmission line.

The matching circuit may include a quarter wavelength transformer.

The feed line may include a microstrip feed line.

The microstrip array antenna may have various characteristic impedances according to design of the microstrip feed line to have different widths.

Each of the plurality of radiation elements may be designed to have different radiation conductance for weighted amplitude design.

The plurality of radiation elements may include a plurality of microstrip stubs.

The distance may be adjusted according to a direction of a main beam of the microstrip array antenna.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 8A and 8B show the design parameter of each prototype shown in FIGS. 7A and 7B;

DETAILED DESCRIPTION

Figure 1A:
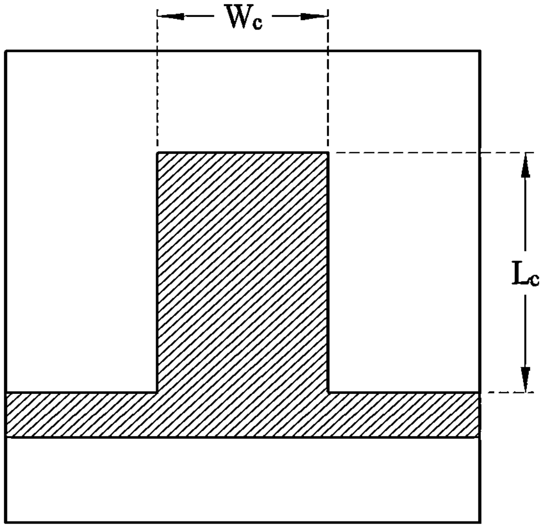
FIGS. 1A and 1B are diagrams illustrating an example of a bottle-neck shaped radiation element according to various example embodiments.

The following detailed structural or functional description is provided as an example only and various alterations and modifications may be made to the example embodiments. Here, example embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like constituent elements and a repeated description related thereto will be omitted.

Figure 1B:
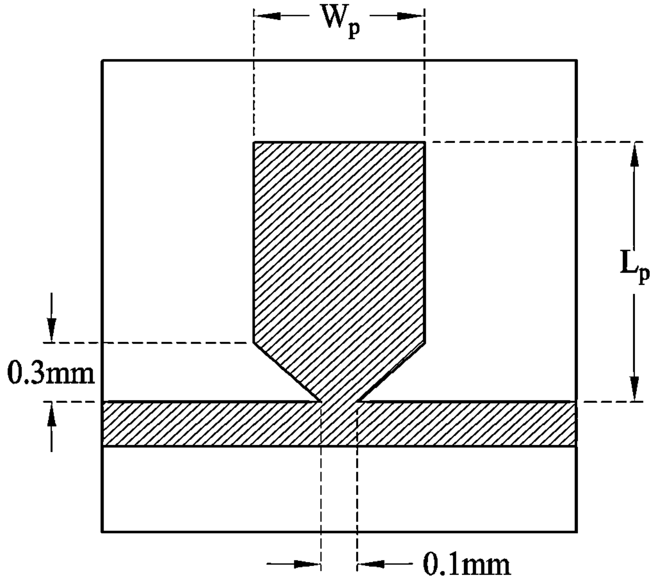

FIGS. 1A and 1B are diagrams illustrating an example of a bottle-neck shaped radiation element according to various example embodiments.

FIG. 1A illustrates a rectangular radiation element having a consistent width (Wc) and length (Lc), and FIG. 1B illustrates an example of a bottle-neck shaped radiation element according to various example embodiments. The bottle-neck shaped radiation element may be formed by symmetrically cutting left and right sides of the bottom portion of the rectangular radiation element, which is electrically connected to a feed line, into two triangular shapes. The triangular shape, which is cut for the easiness of antenna manufacturing and minimization of the variable design parameter, may be fixed to be 0.3 millimeters (mm) in height and 0.1 millimeters (mm) in width and contact the surface of the radiation element and the feed line, but is not limited thereto. The shape of the triangular shape may vary. Hereinafter, it is assumed that the triangular shape has the height and width stated above. The variable design parameter has a width Wc and Wp and length Lc and Lp, the amount of radiation conductance or radiation power of the antenna is adjusted according to the width Wc and Wp of the radiation element, and the resonant frequency may be adjusted according to the length Lc and Lp of the radiation element.

Hereinafter, advantages in design when the bottle-neck shaped radiation element according to various example embodiments is used will be described referring to FIGS. 2 to 5.

Figure 2:
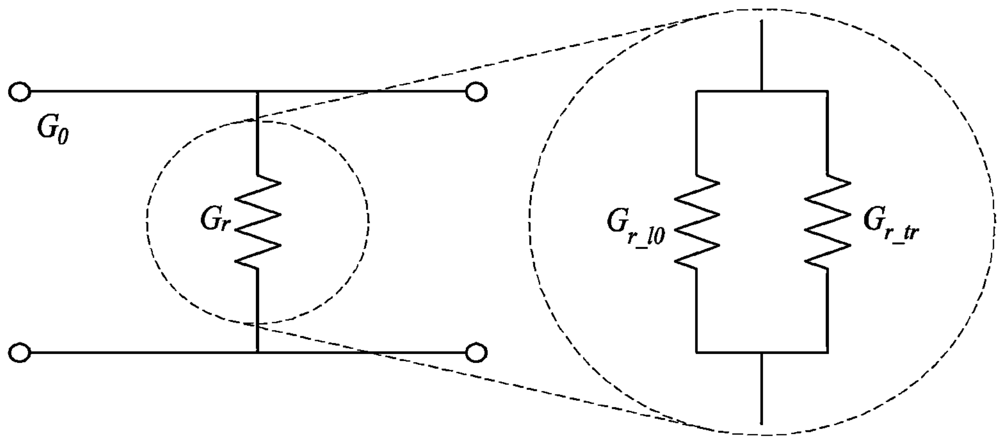
FIG. 2 illustrates an equivalent circuit when a radiation element resonates in a design frequency.

FIG. 2 shows an equivalent circuit when the radiation element resonates in the design frequency.

In FIG. 2, $G_0$ represents characteristic conductance of a feedline and Gr represents radiation conductance of the radiation element. The radiation conductance Gr may be divided into a co-polarized conductance Gr_lo caused by a longitudinal direction current flowing through the radiation element and a cross-polarized conductance Gr_tr caused by a transverse direction current. The co-polarization conductance Gr_lo may refer to radiating co-polarized power caused by longitudinal direction current, and the cross-polarized conductance Gr_tr may refer to radiating cross-polarized power caused by transverse direction current.

In the equivalent circuit shown in FIG. 2, the normalized radiation conductance gr may be expressed as the following equation.

$$g_r\left(=\frac{G_r}{G_0}\right)=-2\frac{S_{11}}{1+S_{11}}=2\frac{1-S_{21}}{S_{21}} \qquad \text{[Equation 1]}$$

Here, $S_{11}$ may be an S-parameter for a reflection coefficient and $S_{21}$ may be an S-parameter for a transmission coefficient.

Figure 3C:
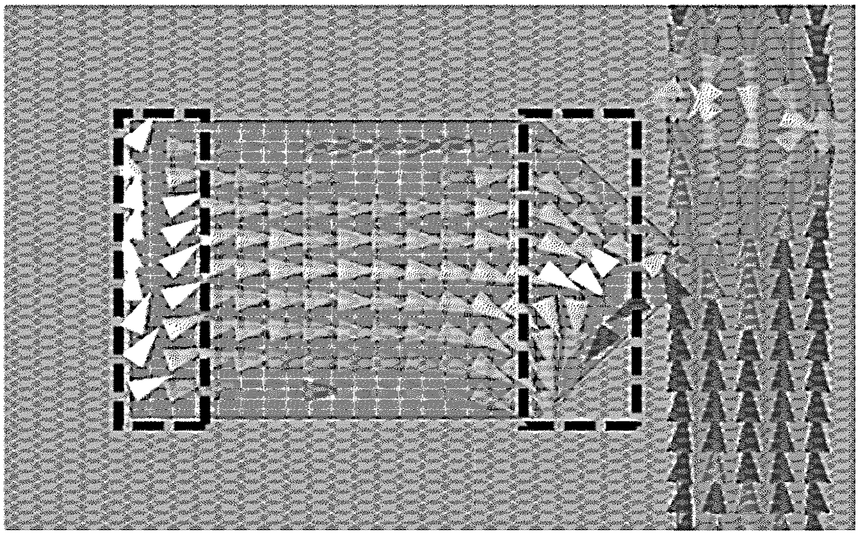
FIGS. 3A through 3C are diagrams illustrating an example of an electric distribution on the bottle-neck shaped radiation element according to various example embodiments.
Figure 3B:
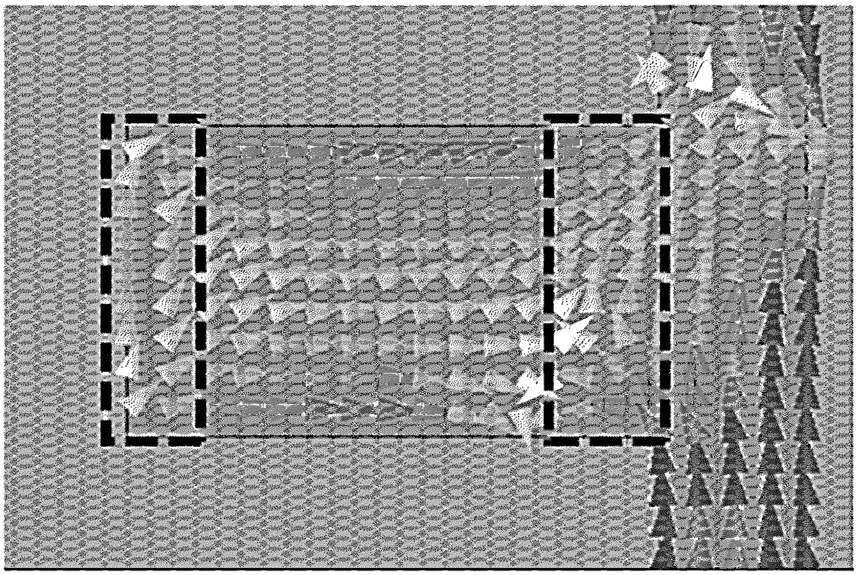
Figure 3A:
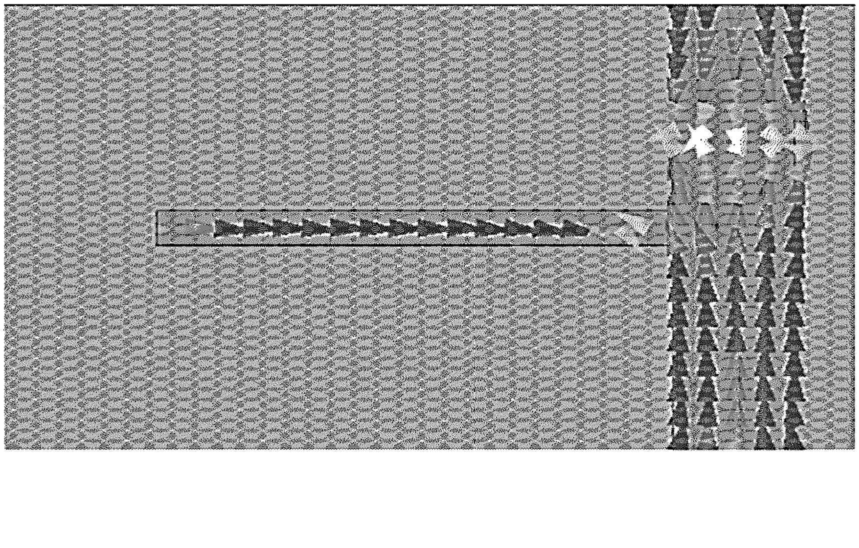

FIGS. 3A through 3C are diagrams illustrating an example of an current distribution on the bottle-neck shaped radiation element and the rectangular radiation element according to various example embodiments.

FIGS. 3A through 3C may illustrate an example of current distribution on a rectangular radiation element and a bottle-neck shaped radiation element (e.g., the bottle-neck shaped radiation element of FIG. 1B) at 79 GHz. According to the width or shape of the radiation element, not only a longitudinal direction current but also a transverse direction current may flow in the radiation element.

Referring to FIG. 3A, the current only flows in the longitudinal direction in a rectangular radiation element with a narrow width, so the radiation conductance Gr may be the same as the co-polarized conductance Gr_lo caused by longitudinal direction current.

Referring to FIG. 3B, a rectangular radiation element with a wide width may have not only longitudinal direction current but also transverse direction current, which flows towards the same direction from both ends of the longitudinal direction. As the width of the radiation element increases, the cross-polarized conductance Gr_tr component caused by transverse direction current increases, so it may be difficult to design the weighting with just the co-polarized conductance Gr_lo component caused by longitudinal direction current.

Referring to FIG. 3C, the bottle-neck shaped radiation element according to various example embodiments may have a transverse direction current which flows towards opposite directions from each end of the longitudinal direction. Therefore, since the transverse direction current components contributing to the radiation of the antenna cancel each other and the cross-polarized conductance Gr_tr caused by transverse direction current is small, total radiation conductance Gr may be almost the same as the co-polarized conductance Gr_lo caused by longitudinal direction current.

Figure 4:
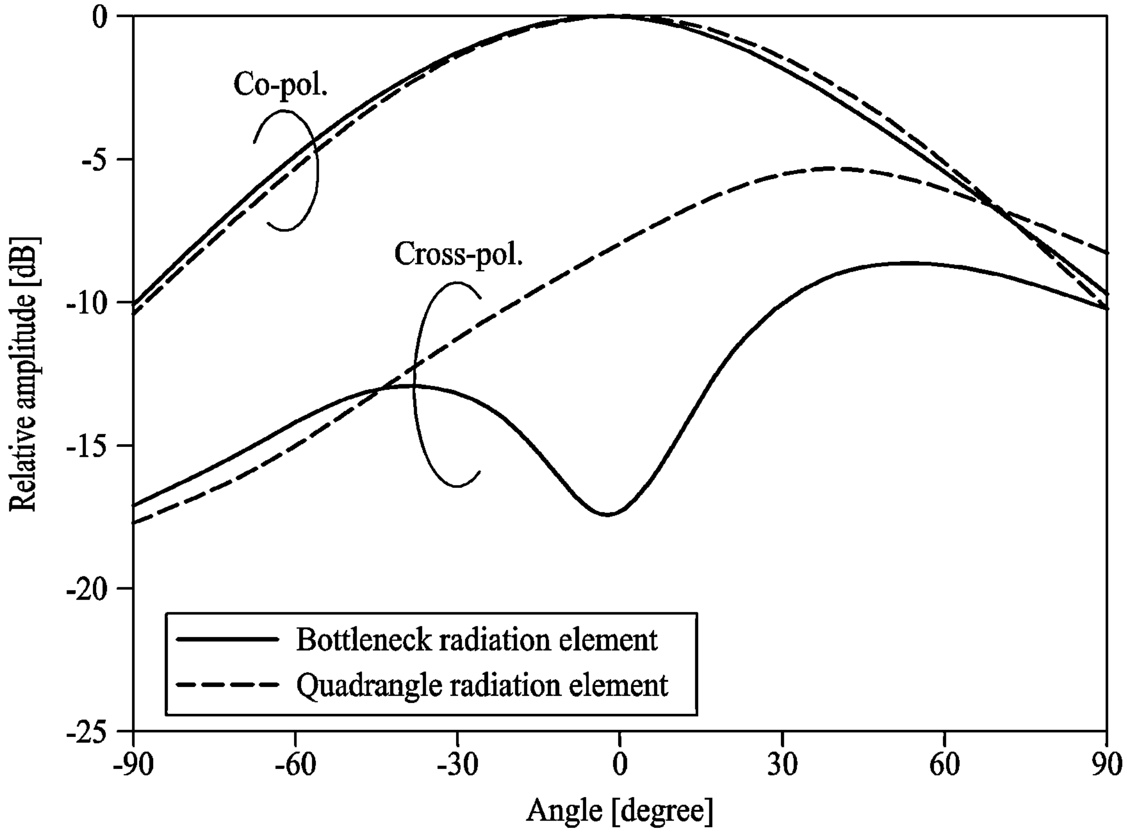
FIG. 4 is a diagram illustrating an example of a normalized radiation pattern of co-polarization and cross polarization of the bottle-neck shaped radiation element according to various example embodiments.

FIG. 4 is a diagram illustrating an example of a normalized radiation pattern of co polarization and cross polarization of the bottle-neck shaped radiation element according to various example embodiments.

FIG. 4 may represent an example of a normalized radiation pattern of the co polarization and the cross polarization of the rectangular radiation element and the bottle-neck shaped radiation element (e.g., the bottle-neck shaped radiation element of FIG. 1B) at 79 GHz. In FIG. 4, the rectangular radiation element and the bottle-neck shaped radiation element may have a same width. Referring to FIG. 4, the cross polarization compared to the co polarization of the rectangular radiation element may be about −9 decibel (dB), but about −18.9 dB for the bottle-neck shaped radiation element. This may mean that the main component of the radiation conductance Gr of the bottle-neck shaped radiation element is the co-polarized conductance Gr_lo caused by longitudinal direction current.

Figure 5:
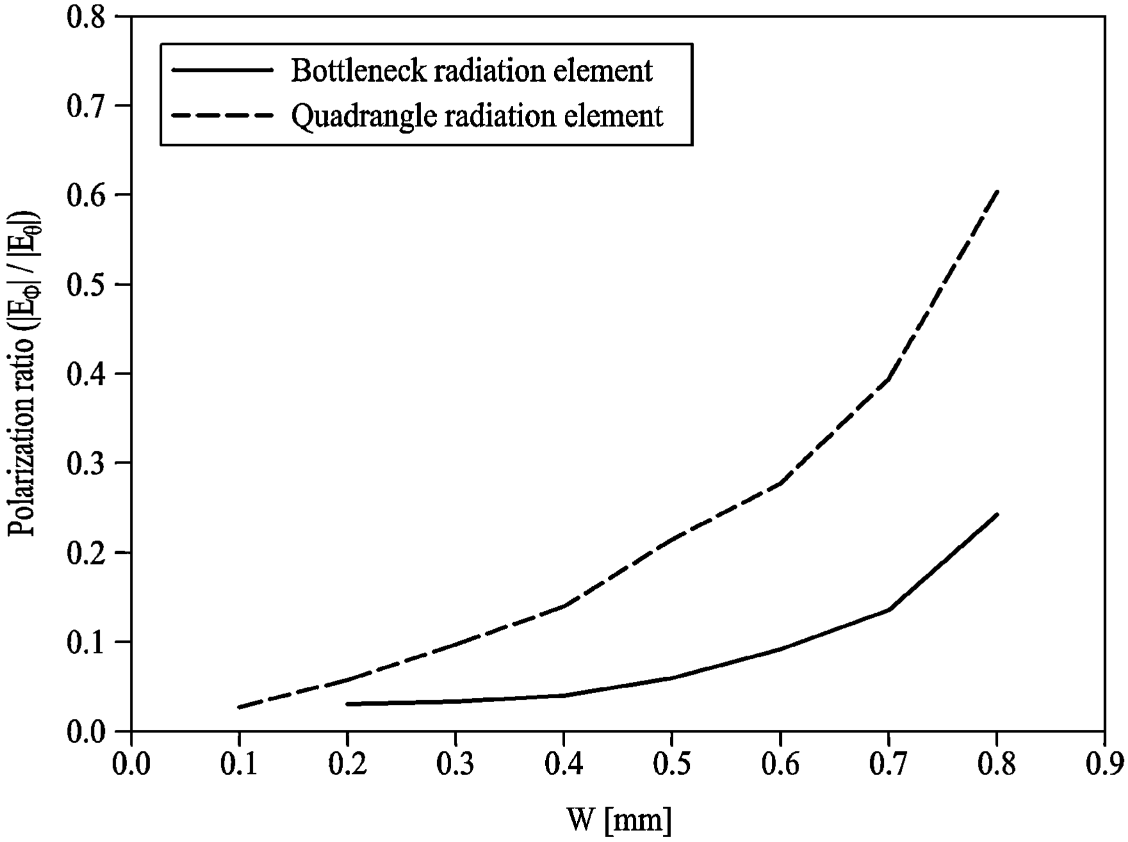
FIG. 5 is a diagram illustrating a ratio of a cross polarization to a co polarization for the bottle-neck shaped radiation element and the rectangular radiation element according to various example embodiments.

FIG. 5 is a diagram illustrating a ratio of a cross polarization to a co polarization in the bottle-neck shaped radiation element and the rectangular element according to various example embodiments.

FIG. 5 may illustrate a ratio (hereinafter, polarization ratio) of a cross-polarization component $E_\theta$ of the co-polarization component $E_\phi$ of the rectangular radiation element and the bottle-neck shaped radiation element (e.g., the bottle-neck shaped radiation element of FIG. 1B) according to the width of the radiation element. Referring to FIG. 5, as the width of the radiation element increases, the polarization ratio calculated from the front of the radiation element increases rapidly in the rectangular radiation element but increases gradually in the bottle-neck shaped radiation element. Since the polarization ratio increases rapidly in the rectangular radiation element, the degree of cross polarization may degrade.

As described above with reference to FIGS. 2 to 5, when the bottle-neck shaped radiation element (e.g., the bottle-neck shaped radiation element of FIG. 1B) according to various example embodiments is used, the total radiation conductance Gr is almost equal to the co-polarized conductance Gr_lo caused by longitudinal direction current, so it is possible to design the antenna using the normalized radiation conductance gr (e.g., refer to equation 1) as is, making it easy to design. In particular, in the case of an antenna having a low side lobe level, the normalized radiation conductance gr value may be used as is in order to design the co-polarization radiation power of each element to have a weighting.

Figure 6:
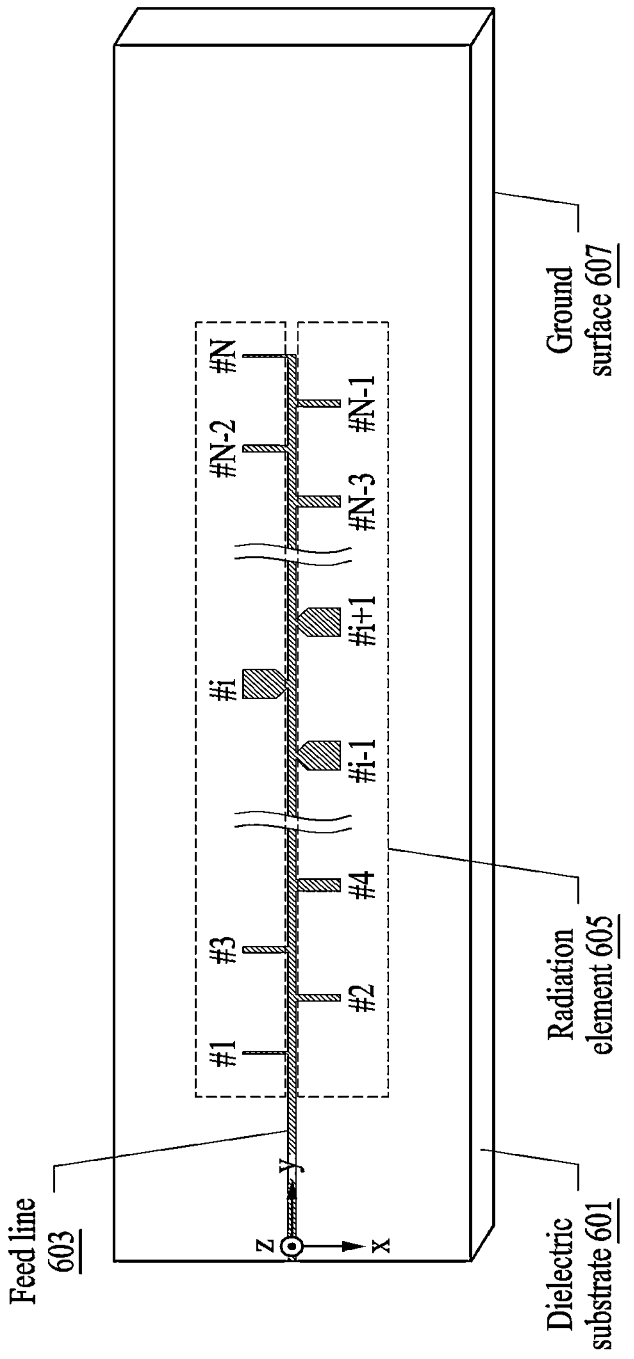
FIG. 6 illustrates a microstrip array antenna using a bottle-neck shaped radiation element according to various example embodiments.

FIG. 6 illustrates a microstrip array antenna using a bottle-neck shaped radiation element according to various example embodiments.

Referring to FIG. 6, according to various example embodiments, a microstrip array antenna 600 may include a dielectric substrate 601, a feed line 603 (e.g., a microstrip feed line) formed on the top surface of the dielectric substrate 601, a plurality of radiation elements 605 (e.g., a plurality of microstrip stubs) formed on the top surface of the dielectric substrate 601, electrically connected to the feed line 603, and at least one of which has a bottleneck shape, and a ground surface 607 formed on the bottom surface of the dielectric substrate 601. One or more bottle-neck-shaped radiation elements 605 may be implemented like the bottle-neck shaped radiation element of FIG. 1B.

According to various example embodiments, the plurality of radiation elements 605 may be arranged by a regular distance on one side of the feed line 603 or arranged in a zig-zag form by a regular distance on both sides of the feed line 603. The distance may be adjusted according to the direction of the main beam of the microstrip array antenna 600. Each of the plurality of radiation elements 605 may be designed to have different radiation weightings. The feed line 603 may be connected directly to a chip or a transmission line to receive power from the chip or the transmission line connected to the microstrip array antenna 600. The feed line 603 may include transitions of various forms. The microstrip array antenna 600 may include various characteristic impedances according to design of the feed line 603 to have different widths.

According to various example embodiments, the microstrip array antenna 600 may further include a matching circuit (e.g., a quarter wavelength transformer) for impedance matching with the chip or the transmission line connected to the microstrip array antenna 600.

Figure 7A:
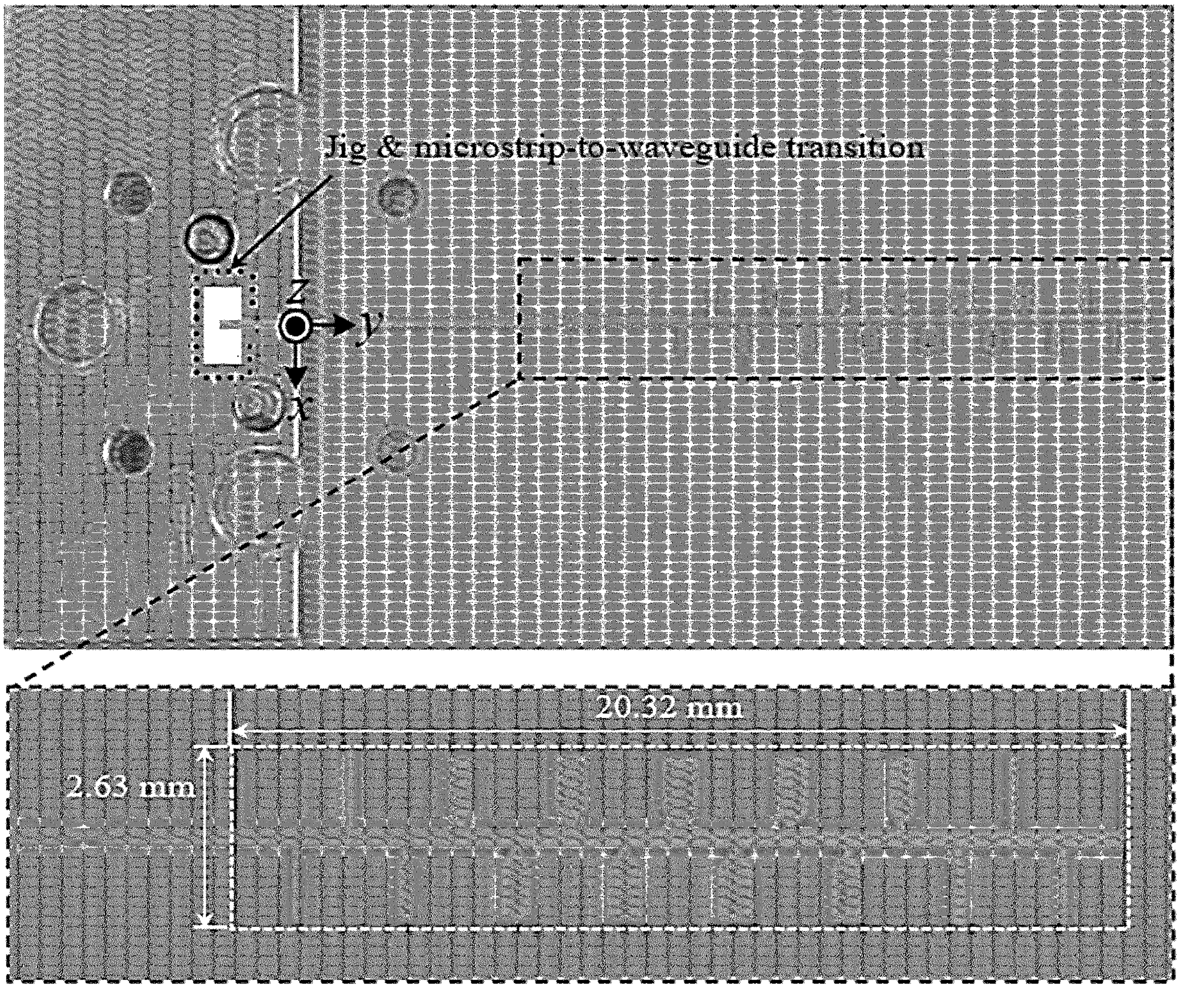
FIGS. 7A and 7B are photographs of a prototype manufactured to compare the performance of the microstrip array antenna according to various example embodiments.
Figure 7B:
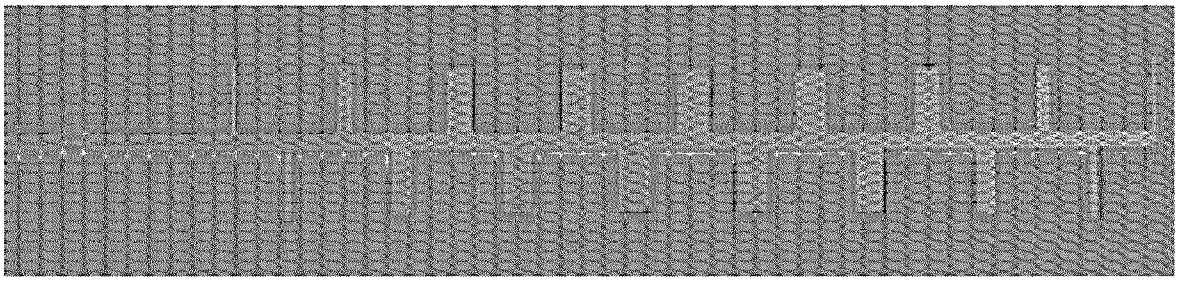

FIGS. 7A and 7B are photographs of a prototype manufactured to compare the performance of microstrip array antennas according to various example embodiments, and FIGS. 8A and 8B show design parameters of each of the prototypes shown in FIGS. 7A and 7B.

In FIGS. 7 and 8, the microstrip array antenna includes 17 microstrip stubs. FIG. 7A is a photograph of a microstrip array antenna in which a bottleneck microstrip stub having a large radiation conductance is formed in the center of the antenna, and (b) is a photograph of a microstrip array antenna consisting only of a rectangular microstrip stub. FIG. 8A shows design parameters of the microstrip array antenna shown in FIG. 7A, and FIG. 8B shows design parameters of the microstrip array antenna shown in FIG. 7B. Rectangular microstrip stubs were used as the 1st, 2nd, 16th, and 17th radiation elements, and bottleneck microstrip stubs were used as the 3rd to 15th radiation elements. The design frequency was set to 79 GHz, which is a millimeter wave band, and designed to have a Taylor distribution with a sidelobe level of −20 dB in the magnetic field (yz-plane) radiation pattern, for weighted amplitude design. However, the design frequency is not limited to Taylor distribution and may have a Chebyshev distribution or a Bayliss distribution. In the Taylor distribution, the radiation conductance value increases at the center of the radiation element array and the radiation conductance value decreases towards both ends of the array, so the radiation element located in the middle of the array may have a relatively larger width. For comparison, a microstrip array antenna having the same radiation conductance was designed using the rectangular microstrip stub as shown in FIG. 7A and FIG. 8B.

Figure 9A:
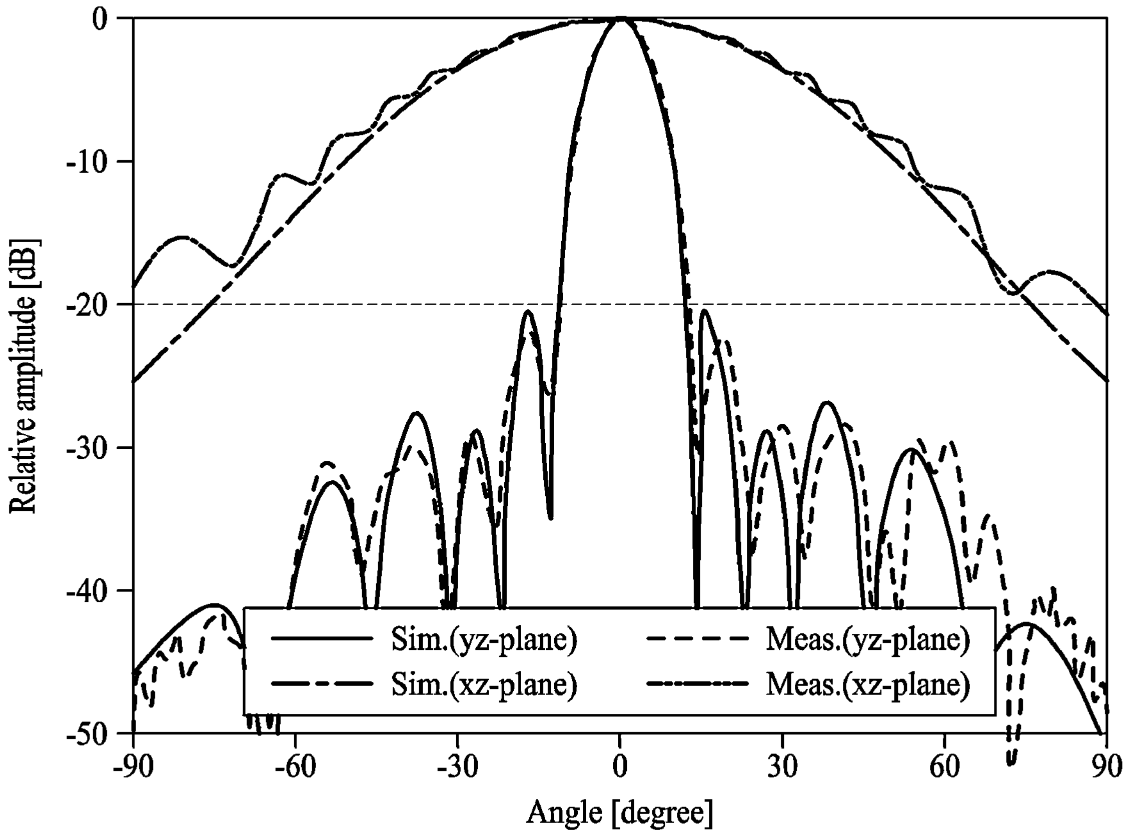
FIG. 9A illustrates a radiation pattern on a magnetic field plane (yz-plane) and an electric field plane (xz-plane) of the microstrip array antenna using the bottle-neck shaped radiation element according to various example embodiments.
Figure 9B:
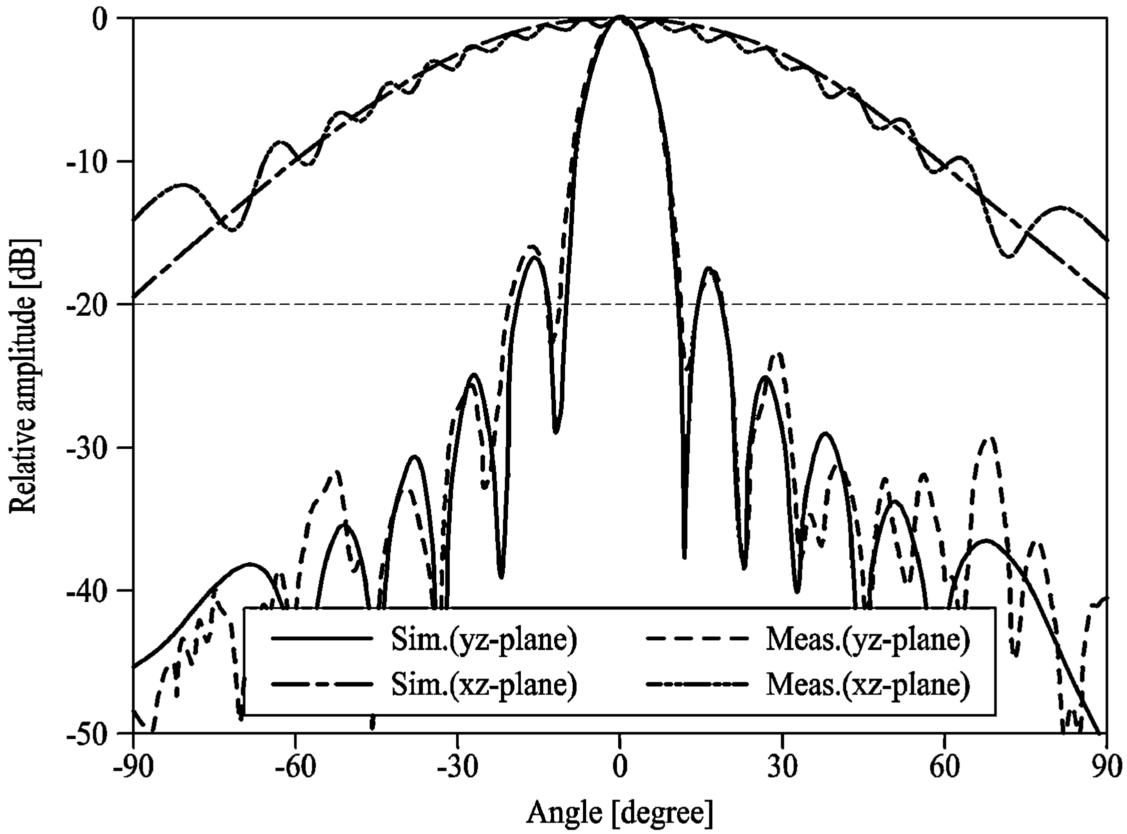
FIG. 9B illustrates a radiation pattern on a magnetic field plane (yz-plane) and an electric field plane (xz-plane) of the microstrip array antenna using the rectangular radiation element.

FIG. 9A illustrates a radiation pattern in the magnetic field plane (yz-plane) and the electric field plane (xz-plane) of the microstrip array antenna using the bottleneck radiation element according to various example embodiments, and FIG. 9B illustrates the radiation pattern in the magnetic field (yz-plane) and the electric field (xz-plane) of the microstrip array antenna using the rectangular radiation element according to various example embodiments.

Referring to FIG. 9A, it is shown that the simulation and measurement results of the radiation pattern of the microstrip array antenna using the bottleneck radiation element according to various example embodiments at a design frequency (79 GHz) are almost identical. The antenna gains are 15.31 dBi and 16.92 dBi in simulation and measurement results, respectively, and the side lobe level in the magnetic field plane (yz-plane) radiation pattern satisfies the design value of −20 dB.

Referring to FIG. 9B, the simulation and measurement results of the radiation pattern of the microstrip array antenna using the rectangular radiation element at a design frequency (79 GHz) are almost identical, and the antenna gains are 14.48 dBi and 16.48 dBi in the simulation and measurement results, respectively. However, in the magnetic field plane (yz-plane) radiation pattern, the side lobe level is −16.8 dB, which does not satisfy the design value of −20 dB.

From the results of FIGS. 9A and 9B, it may be confirmed that the accuracy of beam design may be improved by using the microstrip array antenna using the bottleneck radiation element according to various example embodiments.

Figure 10:
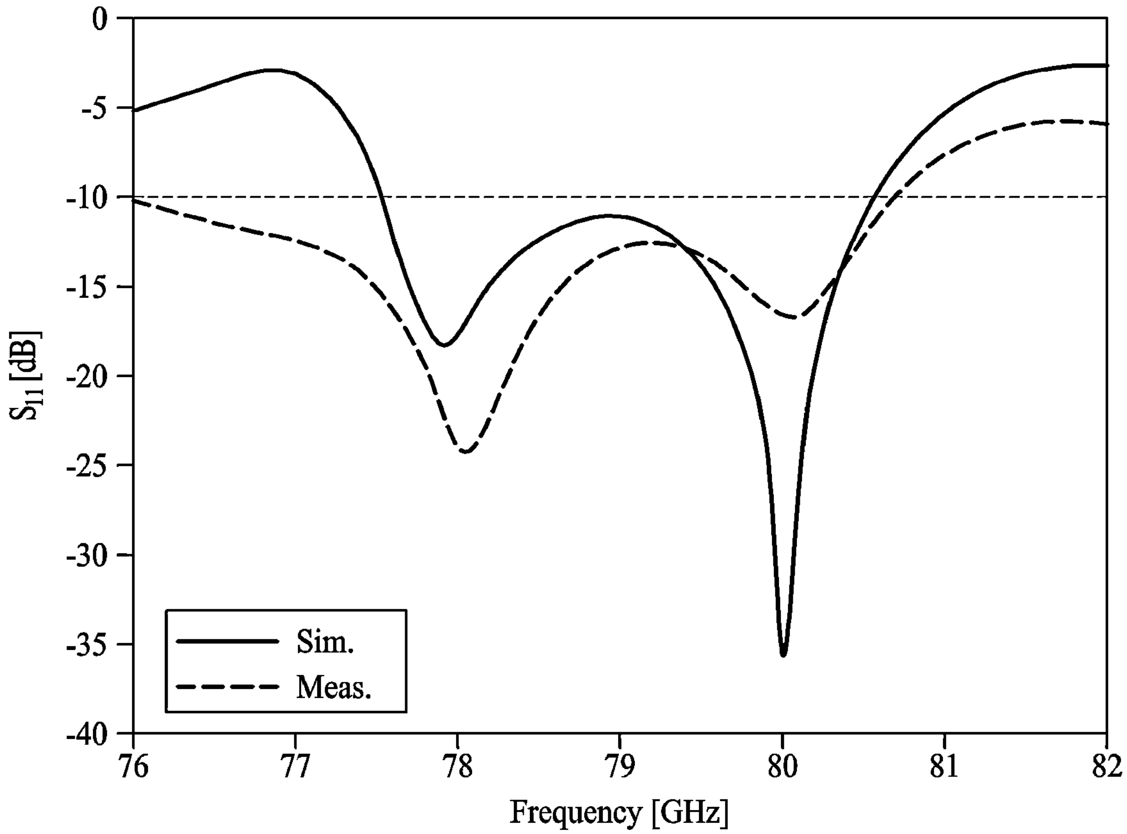
FIG. 10 illustrates reflection coefficients of the microstrip array antenna using the bottle-neck shaped radiation element according to various example embodiments.

FIG. 10 illustrates reflection coefficients of the microstrip array antenna using the bottle-neck shaped radiation element according to various example embodiments.

Referring to FIG. 10, it is shown that the simulation and measurement results are almost identical, and the bandwidth is about 4.67 GHz (76.0 to 80.67 GHz) based on −10 dB.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The above-described devices may be configured to act as one or more software modules in order to perform the operations of the above-described example embodiments, or vice versa.

As described above, although the example embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A microstrip array antenna comprising:

a dielectric substrate;

a single microstrip feed line formed on a top surface of the dielectric substrate;

a plurality of microstrip stubs formed on the top surface of the dielectric substrate and electrically connected to the single microstrip feed line; and a ground surface formed on a bottom surface of the dielectric substrate, wherein the plurality of microstrip stubs comprises a first plurality of microstrip stubs having a bottleneck shape and a second one of the plurality of microstrip stubs having a rectangular shape, and wherein the first plurality of microstrip stubs are arranged in a zigzag form at a regular distance on both sides of the center of the single microstrip feed line and the second plurality of microstrip stubs are arranged in a zigzag form at a regular distance on both sides of the ends of the single microstrip feed line.

2. The microstrip array antenna of claim 1, wherein the plurality of microstrip stubs is arranged by a regular distance on one side of the single microstrip feed line or arranged in a zig-zag form on both sides of the single microstrip feed line.

3. The microstrip array antenna of claim 2, wherein the distance is adjusted according to a direction of a main beam of the microstrip array antenna.

4. The microstrip array antenna of claim 1, wherein the single microstrip feed line is directly connected to a chip or a transmission line to receive power from the chip or the transmission line.

5. The microstrip array antenna of claim 4, wherein the single microstrip feed line comprises various forms of transitions.

6. The microstrip array antenna of claim 4, further comprising a matching circuit for impedance matching with the chip or the transmission line.

7. The microstrip array antenna of claim 6, wherein the matching circuit comprises a quarter wavelength transformer.

8. The microstrip array antenna of claim 1, wherein the microstrip array antenna has various characteristic impedances according to design of the single microstrip feed line to have different widths.

9. The microstrip array antenna of claim 1, wherein each of the plurality of microstrip stubs is designed to have different radiation conductance for weighted amplitude design.

* * * * *